3,492,358
PURIFICATION OF ETHERS
Arthur E. Gurgiolo, Lake Jackson, Tex., assignor to The Dow Chemical Company, Midland, Mich., a corporation of Delaware
No Drawing. Continuation of application Ser. No. 500,197, Oct. 21, 1965. This application Apr. 10, 1968, Ser. No. 720,407
Int. Cl. C07c 41/12
U.S. Cl. 260—615      5 Claims

ABSTRACT OF THE DISCLOSURE

A process for purifying a crude polyoxyalkylene glycol diether contaminated with the corresponding monoether, which comprises simultaneously contacting said crude diether with enough aqueous 3–50% by weight alkali metal hydroxide and an inert water immiscible organic solvent such as hydrocarbons, halohydrocarbons and ethers, to form an aqueous phase and a solvent phase, separating the solvent phase and recovering the diether therefrom.

---

This application is a continuation of copending application Ser. No. 500,197, filed Oct. 21, 1965, and now abandoned.

This invention relates to processes for the purification of polyoxyalkylene glycol diethers. More particularly, it relates to the separation of such diethers from cogeneric impurities, especially the corresponding monoethers, water, salt, alkali and the like.

The glycol diethers are generally made by the Williamson synthesis; i.e., the reaction of an alkali metal alcoholate with an aliphatic halide. This may involve the reaction of either (1) the alkali metal glycolate with aliphatic halide or (2) the glycol dihalide with alkali metal alcoholate. These reactions may be illustrated as follows:

(1)      MOGOM+2RX→ROGOR+2MX (2)      X—G—X+2ROM→ROGOR+2MX wherein M is an alkali metal, R is an aliphatic radical, usually lower alkyl (i.e., 1–4 carbon atoms) or alkenyl, and G is the residue formed by the removal of the two terminal OH groups from a polyoxyalkylene glycol. Such glycol typically consists of 2 to 5 or more oxyalkylene groups of 2 to 4 carbons each (i.e., oxyethylene, oxy-1, 2-propylene and oxy-1,2-butylene).

The above reactions proceed stepwise and do not ordinarily go to completion; hence, the product usually contains considerable amounts of monoether, in addition to glycol, salt, alcohol, water, dehydrohalogenated by-products and other impurities. Because of the presence of these impurities, and particularly in view of the high boiling points and the sensitivity to heat of some of the products and by-products, the separation of the diethers at low cost and in high purity has been a long-standing problem (note, for instance, U.S. Patent 2,919,293).

According to the present invention, polyoxyalkylene glycol diethers are easily separated from the cogeneric monoethers and other by-products and impurities by a liquid-liquid extraction process. In this process, a first liquid phase comprises the diether and an organic solvent therefor while a second liquid phase comprises aqueous alkali and monoether. The second phase may in some cases consist of two phases, (1) an organic phase consisting largely of monoether and (2) an aqueous phase consisting largely of inorganic materials. While it will be recognized, of course, that the above separations are not complete, and that the diether layer will contain some water and the aqueous layer will contain some diether, it has been found that a single extraction stage effects a high degree of separation of mono- and diethers and yields products of adequate purity for many technical purposes. Where higher purity is desired, additional extraction stages readily provide material of any desired purity. The most efficient process for producing such high-purity material comprises a multistage or continuous counter-current extraction process. Since one liquid phase comprises a water-immiscible organic solvent for diether and the other comprises aqueous alkali, and since the crude ether is usually soluble in both, the extraction process can often be carried out by dissolving the crude ether in either the organic solvent or the aqueous alkali and contacting the resulting solution with the other.

In its simplest form the invention can be used to separate a mixture of mono- and diethers by dissolving the mixture in an inert organic water-immiscible solvent in which the mixture is readily soluble and then contacting the resulting solution with an aqueous solution of alkali (i.e., analkali metal hydroxide). Two phases are thus formed: (1) a solution of diether in the organic solvent (saturated with water) and (2) a mixture of aqueous alkali and monoether which is usually a single phase but which in some cases is two phases, (a) monoether and (b) aqueous alkali; each of which is saturated with the other, of course.

The diether is readily obtained in purified form from the above first phase by separating said phase from the other phase or phases and recovering the diether therefrom. After the phase separation, the diether can be separated simply by distilling off the organic solvent, together with any water therein. If the diether is distillable it may be further purified by distillation, preferably under reduced pressure. The by-product monoether can be recovered by conventional means and recycled to the etherification process for conversion to diether.

The success of the process of the invention depends on two critical factors:

(1) Aqueous alkali as the essential component of one phase.

(2) An invert hydrophobic (water-immiscible) organic solvent for the diether as the essential component of the other phase.

It is often true that the diether is appreciably soluble in aqueous alkali and that the monoether is soluble in the organic solvent. All that is required is that the solvent have a substantially greater affinity for diether than for monoether and that it have low solubility for water. Common solvents that meet these criteria include aliphatic, cycloaliphatic and aromatic hydrocarbons and halohydrocarbons and ethers. Specific suitable solvents include hexane, octane, dodecane, petroleum ether, kerosene, cyclopentane, cyclohexane, methylcyclohexane, benzene, toluene, xylene, tert-butyl-benzene, methylene chloride, chloroform, carbon tetra-chloride, ethylene chloride, trichloroethylene, perchloroethylene, methylchloroform, ethylene bromide, tert-butyl bromide, chlorobenzene, bromotoluene, diethyl ether, diisopropyl ether, dibutyl ether, anisole, phenetole and the like. For convenience in separating and recovering the solvent it is preferred that its boiling point be below about 250° C. The most preferred solvents are those that boil below about 150° C. and form azeotropes with water.

The aqueous alkali used in practicing the invention may contain any alkali metal hydroxide but, in the interest of economy, sodium hydroxide is preferred. The concentration may vary widely, depending on the particular materials being processed. Concentrations of 3–50% by weight are operable, the preferred range being 5–15%. When water is already present in the crude ether to be purified, the desired concentration of alkali in the aqueous phase can be attained by the addition of solid alkali or a concentrated solution, such as 70% alkali.

The ratios of organic solvent and aqueous caustic to crude ether can be varied widely within the scope of the invention. Obviously, there must be enough of each to form a substantial separate phase in the mixture being processed. The use of a huge excess of either can result in the substantial disappearance of the phase containing the other; hence, the two should be kept in balance. In general, good results are obtained when 0.5 to 5 parts by volume of each per part of crude ether are used. It is generally preferred that the ratio of solvent to aqueous alkali be between 1:2 and 2:1.

The practice of the invention is illustrated by the following examples.

In a first series of examples, a commercial sample of tetraethylene glycol was etherified by reaction with NaOH and ethyl chloride. The resulting crude ethyl ether mixture was analyzed by vapor phase chromatogdaphy and found to have the following composition (percent by weight):

Triethylene glycol diethyl ether _____ 1.55
Triethylene glycol monoethyl ether _____ 1.90
Tetraethylene glycol diethyl ether _____ 52.10
Tetraethylene glycol monoethyl ether _____ 30.10
Pentaethylene glycol diethyl ether _____ 13.80

In each of Examples 1–6, 100 ml. of the above mixture of ethers, 100 ml. of 10% aqueous NaOH and 100 ml. of solvent were mixed and thoroughly agitated. Upon standing these mixtures separated into 2 or 3 phases, which were then separated. The diethers were found to be largely in the solvent phase, so the percentage of monoether in the residue remaining after evaporation of the solvent was a direct measure of the efficiency of the solvent extraction. The results of some typical experiments are shown in the following table.

TABLE I

| Example | Solvent | Percent Monoether |
|---|---|---|
| 1 | Hexane | 7.8 |
| 2 | Benzene | 18.3 |
| 3 | CCl₄ | 15.5 |
| 4 | Diethyl ether | 17.5 |
| 5 | CH₂Cl₂ | 26.0 |
| 6 | Kerosene | 3 |

Since the crude ether contained a total of 32.0% of monoethers, it is evident that all of the above solvents showed notable selectivity. By their use in successive extraction stages or, better, in continuous counter-current extraction, the content of monoether in the diether can be reduced to any desired minimum.

In a second series of experiments, the crude ether was a mixture consisting of 2 parts by weight of diethylene glycol diethyl ether and one part by weight of diethylene glycol monoethyl ether. A mixture of 100 g. of the mixed ethers, 100 ml. of 10% aqueous NaOH and 100 ml. of hexane was thoroughly agitated, allowed to settle, and separated into phases. The hexane was evaporated from the solvent phase and the amount and composition of the residue was determined. The aqueous layer was then extracted with a second 100 ml. portion of hexane and the solvent residue similarly isolated and analyzed. Results are shown in Table II.

TABLE II

| | Solvent Phase | | |
|---|---|---|---|
| Extraction | Vol., ml. | Residue, g. | Percent Diether in Residue |
| First | 180 | 60 | 84 |
| Second | 110 | 3.5 | 66 |

EXAMPLE 7

The following experiment was conducted to show the effect of varying the concentration and volume of the aqueous alkali used in the process.

A 2:1 by weight mixture of the dimethyl and monomethyl ether respectively, of diethylene glycol was used as the crude ether to be purified. To 15 g. of this mixture was added 15 ml. of hexane and 15 ml. of 10% aqueous NaOH. After agitation followed by settling, it was found that the hexane layer amounted to 21.5 ml. Without separating the phases, 1.5 ml. of 50% aqueous NaOH were added and the process repeated. The hexane layer then amounted to 24.5 ml. Again 1.5 ml. of 50% caustic were added, after which the hexane layer amounted to 25 ml. This layer was then separated and the hexane evaporated, leaving 9 g. of residue which by analysis contained 87.5% of diether.

I claim:

1. The process for purifying a crude polyoxyalkylene glycol diether contaminated with the corresponding monoether, said diether having the formula

ROGOR wherein each R is an alkyl or alkenyl radical of 1–4 carbon atoms and G is the residue formed by the removal of the two terminal hydroxyl groups from a polyoxyalkylene glycol of up to 5 oxyalkylene groups wherein each alkylene group contains 2–4 carbon atoms, said process comprising simultaneously and intimately contacting the crude ether with (a) at least enough aqueous 3–50% by weight alkali metal hydroxide to form a substantial aqueous alkali phase and, (b) at least enough inert water-immiscible organic solvent selected from the group consisting of aliphatic, cycloaliphatic and aromatic hydrocarbons and halohydrocarbons and hydrocarbyl monoethers, said solvent having a boiling point below 250° C., to form a substantial solvent phase, separating said solvent phase, and recovering the diether therefrom.

2. The process of claim 1 wherein the glycol is polyoxyethylene glycol.

3. The process of claim 2 wherein the ethers of the glycol are ethyl ethers.

4. The process of claim 1 wherein the alkali metal hydroxide is sodium hydroxide.

5. The process of claim 3 wherein the solvent is saturated aliphatic hydrocarbon.

References Cited

UNITED STATES PATENTS 2,481,278  9/1949  Ballard et al.
2,520,733  8/1950  Morris et al.

LEON ZITVER, Primary Examiner

HOWARD T. MARS, Assistant Examiner